Figure 3:
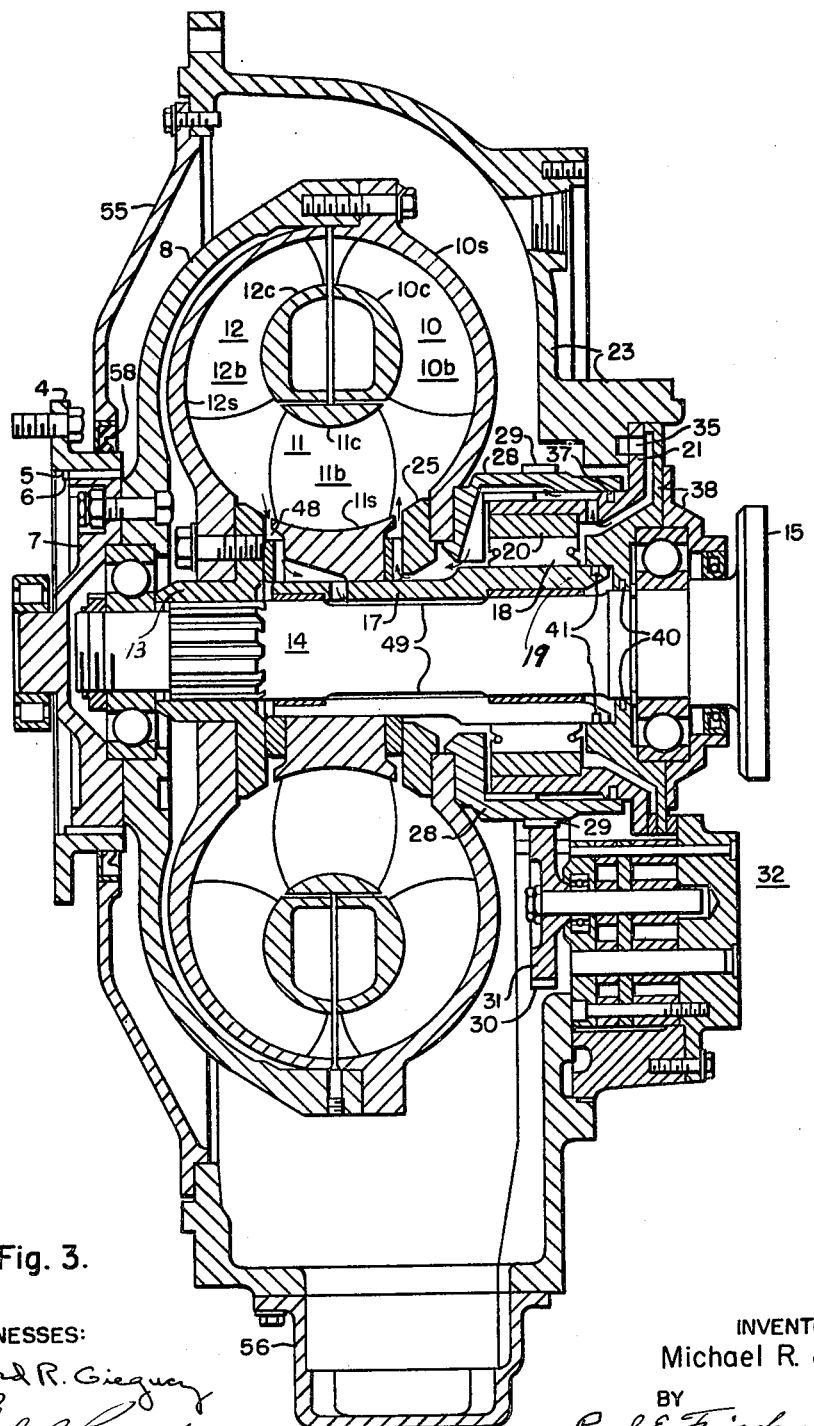

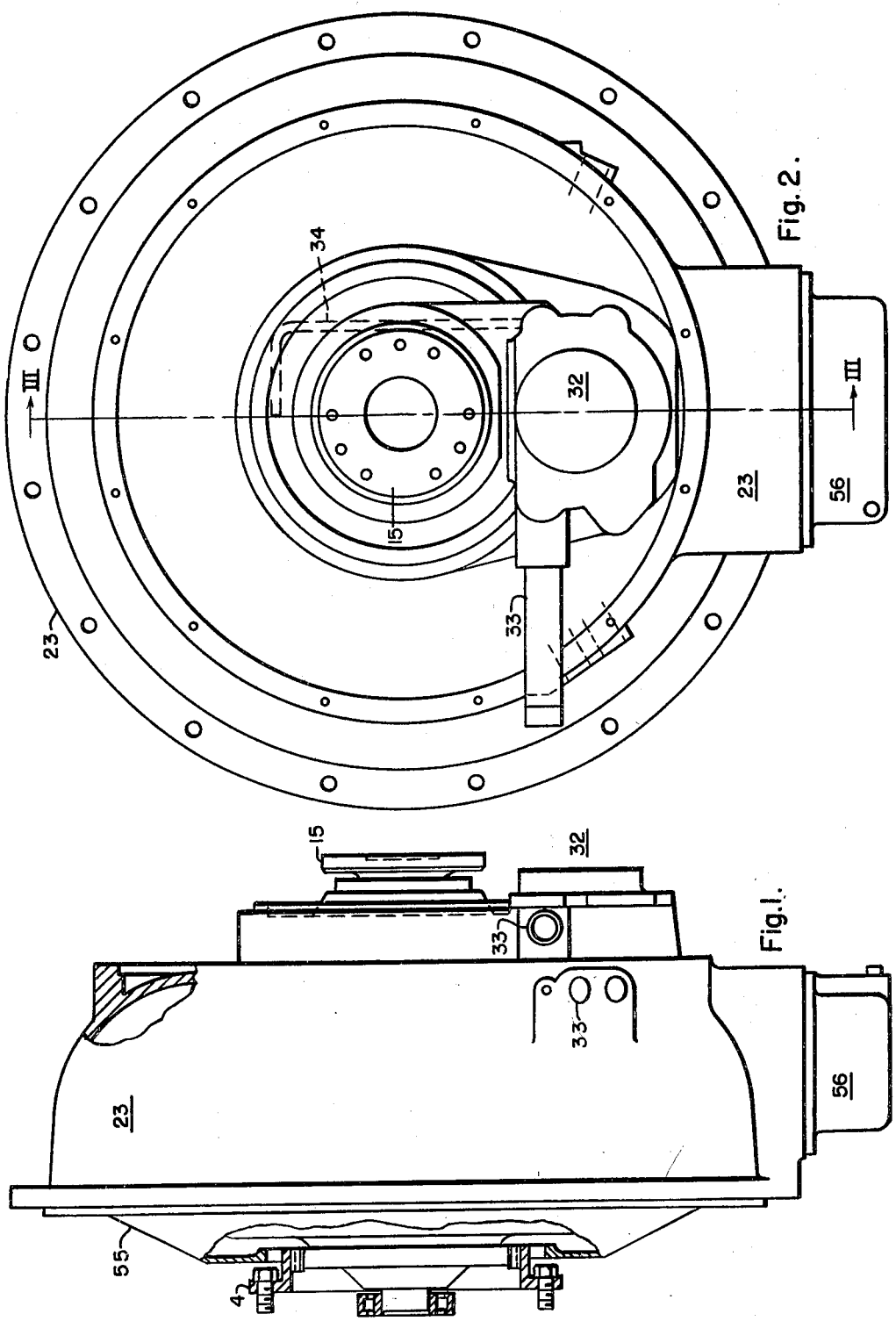

3,005,312
HYDRAULIC TORQUE CONVERTER WITH COMPACT REACTOR BRAKE AND PUMP GEAR ASSEMBLY
Michael R. Jugan, Duquesne, Pa., assignor, by mesne assignments, to Rockwell-Standard Corporation, a corporation of Pennsylvania
Filed Oct. 11, 1957, Ser. No. 689,675
5 Claims. (Cl. 60—54)

My invention relates to an assembly including a hydraulic drive which transmits power solely by dynamic fluid action in a closed recirculating path. More specifically, my invention relates to a torque converter having a reactor which is held stationary by means of a one-way brake, or other disengageable brake, when the device is operating as a torque converter, and which operates as a fluid coupling which makes it possible for the reactor to rotate considerably faster than either the pump or the turbine.

In many previous torque-converters using a free-wheeling or brake-mounted reactor, the free-wheeling or one-way brake was mounted underneath the hydraulic circuit, between the shell or outer shroud of the reactor and a stationary reactor-supporting sleeve which surrounded the turbine-shaft, in order to minimize the over-all axial space-requirements. This arrangement is also convenient for leading pressurized oil or other fluid from the outer periphery of the stationary reactor-supporting sleeve, and thence radially along one side of the reactor-shell, into the closed toroidal circuit of the torque converter. In many cases, there has been so little room, in this location, that it has been extremely difficult to provide a brake having a torque-rating which is greater than the maximum input-torque of the torque-converter.

My present invention relates to a means for bringing the brake out from underneath the hydraulic circuit. I do this by mounting the bore of the reactor-shell directly on a reactor-carrying sleeve which is rotatably mounted on the turbine-shaft; and at some place which is axially displaced from said reactor, I mount the rotatable part of the brake on this rotatable sleeve, so that there will be ample room for the use of a brake having a sufficient diameter to have the necessary torque-rating. I now bring the pressurized-fluid inlet through the stationary part of the brake, and thence through and around the brake to a point where it is led into the toroidal circuit of the torque converter.

My invention is made for a single-stage torque-converter of an extremely compact design, where space is a definite limitation on the design. In such cases, it is frequently advantageous to mount my axially displaced brake, or at least a portion of it, inside of the rim of a driving-gear which is used for driving the fluid-pump which is always used for the purpose of keeping the toroidal circuit of the torque converter full of oil or other fluid, under pressure.

I have somewhat schematically illustrated my invention, in a preferred form of construction, in the accompanying drawing, wherein FIGURES 1 and 2 are side and end elevational views of the hydraulic-drive assembly, and FIG. 3 is a vertical longitudinal sectional view on the plane indicated at III—III in FIG. 2.

Referring to FIG. 3, power is supplied to the left-hand side of the assembly, through a driving connection which includes a flywheel-gear 4 which is adapted to be bolted to the end of a flywheel (not shown) of an engine or other prime mover. This gear 4 is provided with internal teeth 5 which mesh with external teeth 6 on a drive-gear 7, which is bolted to a pump-cover or impeller-cover 8. The impeller-cover 8 is peripherally bolted to the pump or impeller 10 of a torque converter, which is illustrated as comprising a reactor 11 and a turbine 12, in addition to the pump or impeller 10. These three members of the torque converter are placed adjacent to each other, and they operate by circulation of fluid in a closed torodial circuit, in a known manner. While I have illustrated my torque converter as a simple kind of single-stage converter, it is to be understood that other, very much more complex, assemblies could be used, such as those containing more than one impeller 10, more than one reactor 11, and more than one turbine 12. There are also many variations in the manner in which these three members of the converter may be assembled, and in the various shapes and proportions which they may assume. Each of these three members contains a number of blades, 10b, 11b or 12b, extending all around the member, these blades being formed integrally with a core or inner shell 10c, 11c or 12c, and a shell or outer shroud 10s, 11s or 12s.

The turbine-shroud 12s is provided with a central bored part which is bolted to a turbine-hub 13, which is keyed to a rotatably mounted turbine-shaft 14, which terminates, at its right-hand end, in a coupling-flange 15 for connection to the work which is to be driven.

In accordance with my present invention, the bore of the reactor-shroud 11s is fixed directly on a reactor-carrying sleeve 17, which is mounted rotatably on the turbine-shaft 14. This rotatable reactor-carrying sleeve 17 extends in an axial direction far enough to the right to come outside of the space which is underneath the toroidal hydraulic circuit of the torque converter. At a place which is thus axially displaced from the reactor 11, this rotatable reactor-carrying sleeve 17 carries the rotatable brake part 18 of a brake, which is preferably a one-way or free-wheeling brake, as shown, but which could be regarded as being representative of any disengageable brake, the parts of which may be engaged and disengaged either manually, or automatically in response to pressure or in response to speed. The brake is provided with a stationary brake part 20, which is shown in the form of an outer race 20 which is stationarily mounted in a stationary bracket 21 which is bolted in a centrally disposed bore of a housing 23.

When a one-way or free-wheeling brake 18 is used, as shown, its rotor member 19, and the reactor-carrying sleeve 17, are locked to the outer race 20, so that the reactor 11 cannot rotate during the torque-multiplying range when the turbine blades 12b are rotating slower than the impeller blades 10b. During the fluid-coupling range, the speed of the turbine-blades 12b is about the same as the speed of the impeller blades 10b, and it is usually during this range that there will be a reaction with the reactor-blades 11b, tending to rotate the reactor 11 in free-wheeling, in the direction permitted by the one-way or overrunning brake 18, so that the reactor 11 can rotate freely to get out of the way, sometimes at approximately the same speed as both the impeller 10 and the turbine 12, and sometimes at a speed which is considerably faster than either the impeller 10 or the turbine 12.

In the particular design which is illustrated, the impeller shell 10s is provided with a central bored part which is bolted to a separate ring-member 25, having a bore which is spaced from the outer periphery of the reactor-carrying sleeve 17. The central bored part of the impeller-sleeve 10s is also illustrated as carrying the supporting flange of a driving-gear 28, which carries external teeth 29 which mesh with the external teeth 30 of an oil-pump gear 31, which drives a suitable oil-pump 32 or other fluid-pump, which is adapted to receive fluid through an oil-inlet 33, as shown in FIG. 2, and to discharge pressurized oil or other fluid, through suitable fluid-connections 34, as indicated in dotted lines in FIG. 2, so as to supply pressurized fluid through a hole 35 (FIG. 3) in any portion of the stationary member, such as the bracket 21, which supports the stationary brake-part or outer race 20.

In a preferred form of construction of my device, in order to keep the dimensions of my torque-converter assembly as small as possible, the stationary brake-supporting bracket 21 has a cylindrical brake-supporting part which is disposed inside of the driving-gear 28; and a fluid-seal 37 is provided between these two parts. I also provide a two-part bearing-bracket 38, which is stationarily carried by the central bored portion of the housing 23. This bearing-bracket 38 is provided with a fluid-seal 40 between it and the turbine-shaft 14, and it is also provided with another fluid-seal 41 between it and the rotatable reactor-supporting sleeve 17.

As has been previously known, the rotating driving-gear 28, the stationary brake-supporting bracket 21, the stationary bearing-housing 38, and the rotatable reactor-carrying sleeve 17 all cooperate to provide a fluid-enclosure for the rotatable and stationary brake-parts 18 and 20. The pressurized-fluid inlet-hole 35 in the stationary brake-supporting bracket 21 thus admits pressurized fluid into this fluid-enclosure which encloses these brake-parts 18 and 20. Some of this fluid passes through or between the engaging brake-parts, while the major portion of the fluid passes through suitable grooves or passageways around the brake-parts, thus lubricating and cooling the brake.

This fluid-enclosure of the brake-assembly necessarily has a suitable fluid-outlet connection to the closed toroidal circuit of the torque converter. In the particular design which has been chosen for illustration in FIG. 3, this fluid-outlet connection includes a space between the supporting flange of the driving-gear 28 and the reactor-carrying sleeve 17, another space between the rotating ring 25 of the impeller-sleeve 10s and said reactor-carrying sleeve 17, and a radial space between said ring 25 and the right side of the reactor-sleeve 11s, so that the pressurized fluid enters the closed toroidal circuit of the torque converter.

This closed toroidal circuit of the torque converter is provided, on the left side of the reactor-shell 11s (in the illustrated form of embodiment), with a discharge-opening 48, through which the fluid is led to the annular space 49 between the reactor-supporting sleeve 17 and the turbine-shaft 14. The oil in this annular space 49 is drained, in a known manner, through suitable means (not shown), to an oil tank (not shown), out of which the oil is withdrawn, again, to enter the oil-inlet 33 (FIG. 2) of the oil or fluid-pump 32.

The housing 23 is a well-known part, which provides a fluid-type enclosure-means which encloses all of the parts of my invention, except the flywheel-gear 4 and the coupling-flange 15. The enclosing action of the housing 23 is aided by such removable fluid-tight accessory-parts as a housing-cover 55, which is shown at the left-hand side of the housing 23, and an oil-pan 56, which is shown at the bottom of the housing 23. The left-hand housing-cover 55 has a central bored portion which carries an oil-seal 58, which makes contact with an outer cylindrical peripheral surface of the flywheel-gear 4.

In accordance with my invention, therefore, I take the overriding brake 20 out of the space between the bore of the reactor-shell 11s and the reactor-carrying sleeve 17, where there is, in prior art designs, insufficient room for a brake which has as much torque-carrying capacity as would be desired; I make the reactor-carrying sleeve 17 rotatable, instead of stationary; I reverse this brake, so that its stationary part 20 is outside of its rotatable part 18; and I place the rotatable brake-part 18 on a portion of the reactor-carrying sleeve 17 which is axially displaced from the reactor-sleeve 11s.

According to a preferred form of embodiment of my invention, I provide a pressurized-fluid connection-means, for feeding said pressurized fluid to the closed toroidal circuit of the torque converter, by causing said fluid to flow radially inwardly, from an outer stationary brake-part 20, 21, or the like, to or past an inner brake-part 18, thence axially along the outer periphery of a rotatable reactor-carrying sleeve 17, to a side of the reactor-shroud 11s, and finally radially outwardly into the closed toroidal circuit of the torque converter. While this is somewhat more complicated than the previously used pressurized-fluid-connection, wherein the flow was simply radially outward, from a stationary reactor-carrying sleeve 17 to the closed toroidal circuit of the torque converter, the slight extra complication is more than justified by its advantage in providing more room wherein a brake of adequate diameter or torque-rating can be provided.

In a preferred form of embodiment of my invention, I also conserve the much needed space which is occupied by the torque-converter assembly, by using a gear-driven fluid-pump 32 which has a driving-gear 28 which surrounds all (or at least a portion) of my axially displaced brake 18, 20, so that my brake is now placed inside of the driving-gear 28 of the fluid-pump 32, as distinguished from the old construction in which the brake was placed inside of the bore of the reactor-shell 11s.

In describing and illustrating my invention, I have resorted to schematic or conventionalized showings of some of the standard parts, the details of which do not form any part of my contribution to the art, aside from the fact that suitable equivalent parts may be necessary or desirable in my assembly. I wish to emphasize that there are many possible choices as to the numbers, shapes, and relative arrangements of the members of a torque converter or other hydrodynamic drive, and that there are many possible variations in the precise details of the fluid-circulation connections. While I have shown my invention, therefore, in a single illustrated form of embodiment, which is at present preferred, I am not limited to the details, or precise dimensions, or precise forms, of the various elements which make up the essential features of my installation; but I consider that my invention, at least in its broadest aspects, contemplates the substitution of substantial equivalents for the various elements which make up the assembly as a whole, the addition of various accessories such as seals, valves, gauges, heat-exchangers, filters, and other parts which make up an actual installation in service, and the omission of such parts as may not be necessary in any particular instance.

I claim as my invention:

1. In a hydraulic drive assembly, an output shaft; a sleeve surrounding and concentrically journalled upon said output shaft; a fixed housing having an annular part surrounding a portion of said sleeve, a sprag type one way brake operatively interposed between said housing part and said sleeve to limit the rotation of the latter to but a single direction; and an external annular pump drive gear surrounding said housing part in radially spaced relation; cooperating radially spaced means on said housing and the inner periphery of said gear and the outer periphery of said sleeve providing fluid tight seals therebetween; said shaft, said sleeve, said part, said brake and said gear all being nested one within the other in surrounding relation to each other to provide an axially compact structure; and a torque converter arranged in coaxial relation axially adjacent said structure, and comprising a reactor member fixed to said sleeve at the end opposite said housing seal, a turbine fixed to said shaft, an engine driven impeller fixed to said gear and means defining a closed fluid circuit through said turbine, stator and impeller; and a positive displacement pump having a fluid outlet connected in fluid communication with said fluid circuit and driven by said gear.

2. In a torque converter, a relatively stationary housing, bladed turbine and impeller members coaxially mounted for rotation within said housing, a bladed reactor member mounted for rotation within the housing coaxially of said reactor turbine and impeller members and disposed axially between said turbine and impeller members, said reactor member having a sleeve portion projecting axially through said impeller member, an annular gear rigid with the impeller member and projecting axially in spaced surrounding relation with respect to said sleeve portion a brake element support fixed to said housing and projecting into the space between said gear and said sleeve portion, coacting unidirectional brake elements on said sleeve portion and said support, coacting fluid seal means between the gear and housing and said sleeve portion so that said support extends into a fluid tight chamber containing said brake elements, a pump driven by said gear, and means providing a fluid circuit from said pump through said chamber into the portion of said housing containing said bladed members.

3. In a hydraulic drive torque converter, a housing structure adapted to contain fluid that is recirculated in a closed path, a turbine shaft rotatably mounted on said housing and projecting thereinto at one side, an impeller having a hub rotatably mounted on said shaft at the other side of said housing, input drive means extending through said other side of said housing to said impeller, fluid tight seals between the housing and said input drive means and said turbine shaft, a turbine member having a hub non-rotatably mounted on said shaft, said impeller member having a shroud portion extending over said turbine member and a bladed portion secured to the shroud portion and having an apertured central section surrounding the shaft in spaced relation thereto, a bladed reaction member disposed between said turbine member and the bladed impeller portion and having a mounting sleeve rotatably mounted on said shaft, said sleeve extending axially through said apertured central section of the impeller to provide within the housing a mounting for part of a unidirectional brake assembly that is displaced axially of said bladed impeller portion toward said one side of the housing, an annular pump drive gear fixed on the bladed portion of the impeller member and surrounding the extended part of said sleeve, a fixed mounting for another part of a unidirectional brake assembly rigid with said one side of the housing and projecting into the space between the gear and extended sleeve, a unidirectional brake assembly operatively mounted in said space and between said fixed mounting and said extended sleeve part, and coacting fluid seal means between the inner periphery of said gear and the housing and the outer periphery of said extended sleeve part.

4. In a hydraulic power transmission assembly comprising relatively rotatable bladed impeller, turbine and reactor members housed in housing means defining a torous chamber and adapted to transmit rotation therebetween by means of a closed toroidal fluid circuit, a pump drive gear carried by the impeller member and operatively connected to a pump continuously circulating fluid through said circuit, said gear comprising a hollow hub portion extending axially outwardly from said impeller member, means defining a stationary hollow annular brake support hub extending inwardly from said housing means oppositely to said gear hub and telescopingly into said gear hub, a one-way brake assembly having an outer race mounted on said stationary hub and an inner race operatively connected to said reactor member, seal means between the end of said gear hub opposite the impeller and the housing axially outwardly of said brake assembly, and a fluid passage through said stationary hub connected at one end to the pump and at the other end to said circuit.

5. In the hydraulic power transmission assembly defined in claim 4, a drive shaft attached to said turbine member, a sleeve secured to said reactor member rotatably surrounding said shaft and extending telescopingly within said stationary hub, the inner race of said brake assembly being mounted on said sleeve, and fluid seal means between the outer end of said sleeve and the housing.

References Cited in the file of this patent

UNITED STATES PATENTS

| | | |
|---|---|---|
| 2,232,101 | De Turk | Feb. 18, 1941 |
| 2,448,678 | McFarland | Sept. 7, 1948 |
| 2,630,682 | Wemp | Mar. 10, 1953 |
| 2,707,408 | Ahlen | May 3, 1955 |
| 2,717,673 | Zeidler | Sept. 13, 1955 |
| 2,735,267 | Tuck | Feb. 21, 1956 |
| 2,737,827 | Seybold | Mar. 13, 1956 |
| 2,750,018 | Dundore | June 12, 1956 |